(12) United States Patent
Turner

(10) Patent No.: US 9,727,569 B2
(45) Date of Patent: Aug. 8, 2017

(54) TRANSITIVE FILE COPYING

(75) Inventor: Bryan A. Turner, Beaverton, OR (US)

(73) Assignee: Autodesk, Inc., San Rafael, CA (US)

(*) Notice: Subject to any disclaimer, the term of this patent is extended or adjusted under 35 U.S.C. 154(b) by 1009 days.

(21) Appl. No.: 12/368,940

(22) Filed: Feb. 10, 2009

(65) Prior Publication Data

US 2010/0205161 A1    Aug. 12, 2010

(51) Int. Cl.
*G06F 17/30*    (2006.01)
*G06F 15/16*    (2006.01)
*G06F 11/14*    (2006.01)

(52) U.S. Cl.
CPC .. *G06F 17/30115* (2013.01); *G06F 17/30575* (2013.01); *G06F 11/1464* (2013.01)

(58) Field of Classification Search
CPC .................................................. G06F 17/30575
USPC ............................................................ 707/697
See application file for complete search history.

(56) References Cited

U.S. PATENT DOCUMENTS

| | | | | |
|---|---|---|---|---|
| 5,339,247 A | * | 8/1994 | Kirihara et al. | 700/106 |
| 7,272,645 B2 | * | 9/2007 | Chang et al. | 709/223 |
| 7,783,777 B1 | * | 8/2010 | Pabla et al. | 709/238 |
| 7,865,575 B2 | * | 1/2011 | Leitheiser | 709/219 |
| 2002/0049760 A1 | * | 4/2002 | Scott et al. | 707/10 |
| 2003/0105716 A1 | * | 6/2003 | Sutton et al. | 705/50 |
| 2003/0233455 A1 | * | 12/2003 | Leber et al. | 709/226 |
| 2005/0131900 A1 | * | 6/2005 | Palliyll et al. | 707/10 |
| 2006/0106885 A1 | * | 5/2006 | Blumenau et al. | 707/200 |
| 2008/0270436 A1 | * | 10/2008 | Fineberg et al. | 707/101 |
| 2010/0094817 A1 | * | 4/2010 | Ben-Shaul et al. | 707/697 |

OTHER PUBLICATIONS

Microsoft Support, "How a slow link is detected for processing user profiles and Group Policy", Feb. 23, 2007.*

* cited by examiner

*Primary Examiner* — Brittany N Allen
(74) *Attorney, Agent, or Firm* — Gates & Cooper LLP

(57) ABSTRACT

A method, apparatus, and article of manufacture provide an alternative mechanism for copying files. A request to copy a first file from a first source location to a first target location is received. A first checksum value of the first file is determined and used in a query to find a second source location for a second file. The second file has a second checksum value that is equivalent to the first checksum value. Additionally, the second file is located at the second source location. A determination is made regarding whether to copy the first file from the first source location or the second file from the second source location. Thereafter, the first source file or the second source file is copied to the first target location based on the determining.

20 Claims, 3 Drawing Sheets

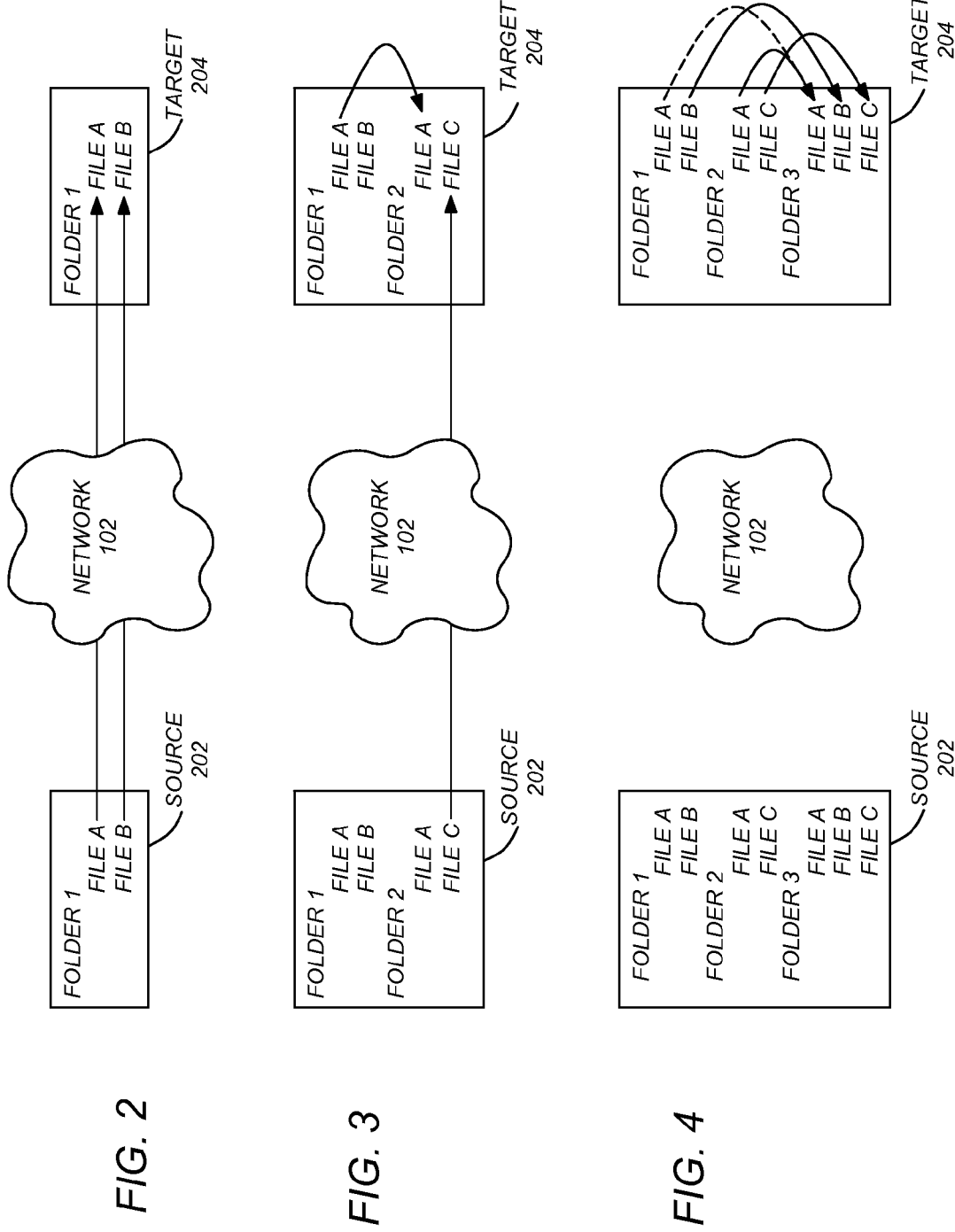

TRANSITIVE FILE COPYING

BACKGROUND OF THE INVENTION

1. Field of the Invention

The present invention relates generally to copying files in a computer system, and in particular, to a method, apparatus, and article of manufacture for an alternative copying mechanism using a transitive file copy.

2. Description of the Related Art

Often times, files or folders are copied from one location (i.e., a source location) to another location (i.e., a target location). Further, there are commonly multiple copies of the same file in multiple different locations both on the same computer and across multiple different computers and/or computer networks. However, when a file is requested from a particular location, the prior art commonly satisfies the request by copying the file from the particular location, even though the same file may be available in a closer location or a location available via higher bandwidth or faster transfer capabilities. Such problems may be better understood with a description of prior art file transfers and requests.

In normal day to day operation, some companies may post more than 15 GB of files to as many as eight (8) (or more) different server locations throughout the world. Of that 15 GB of files, about 25% of the content from these postings may be unique from one posting to the next. The remaining 75% is duplication from the previous posting. Accordingly, in such a company, roughly 11.25 GB of the same data is posted daily with the only difference being the destination folder that the files are being copied to.

The prior art fails to provide a mechanism that is "smart" enough to determine that the same file is already available in a different location on a machine locally. Instead, the prior art solves the problem by a user manually logging into a remote destination machine, making a copy of the existing files, and then selectively copying the files that are different. Such a prior art technique is a labor intensive operation that is error prone and requires user/human knowledge of which files are different and which ones are the same. When a network utilizes n remote locations, such a selective copying operation requires exponentially more effort by the user.

Prior art mechanisms may provide many expensive file copy/mirror programs but still fail to solve the fundamental problem of the same files being copied to different locations repeatedly. Further, prior art techniques fail to handle the issue of files that are the same other than their names (a simple rename operation) and files that are the same, but are going to a different folder on the same machine.

In view of the above, it can be seen that prior art techniques fail to take advantage of and utilize redundant file copies. Such a failure results in increased traffic on overburdened networks. In addition, the prior art techniques for file/folder transfers/posts are slow. What is needed is a technique that solves bandwidth/time issues for the transferring of large data files over a network.

SUMMARY OF THE INVENTION

Instead of pulling down/copying a requested file from across a network, embodiments of the invention utilize a transitive file copy that is able determine that the same file exists locally. The embodiments are enabled to copy such a file using only a small amount of network bandwidth thereby decreasing the time it takes to copy the file. Such a practice results in a decrease in time to post a file or folder, as well as a lower bandwidth requirement.

BRIEF DESCRIPTION OF THE DRAWINGS

Referring now to the drawings in which like reference numbers represent corresponding parts throughout:

FIG. 2 illustrates the copying of a first from a source to a target;

FIG. 3 illustrates the copying of a file from a local location on a target to a second location on the target;

FIG. 4 illustrates the copying of all files from a local location on the target to a different location on the target.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention utilize a transitive file copy such that when a request to copy a file from a particular location is received, the file may not be copied from the particularly requested location but is copied from a location that provides for the optimal transfer (e.g., closest location, fastest transfer speed, highest bandwidth, etc.). Thus, embodiments of the invention take advantage of an utilize redundant network file copies, relieves traffic on overburdened networks, and increases the speed for positing and transferring large files and folders.

Hardware and Software Environment

Figure 1:
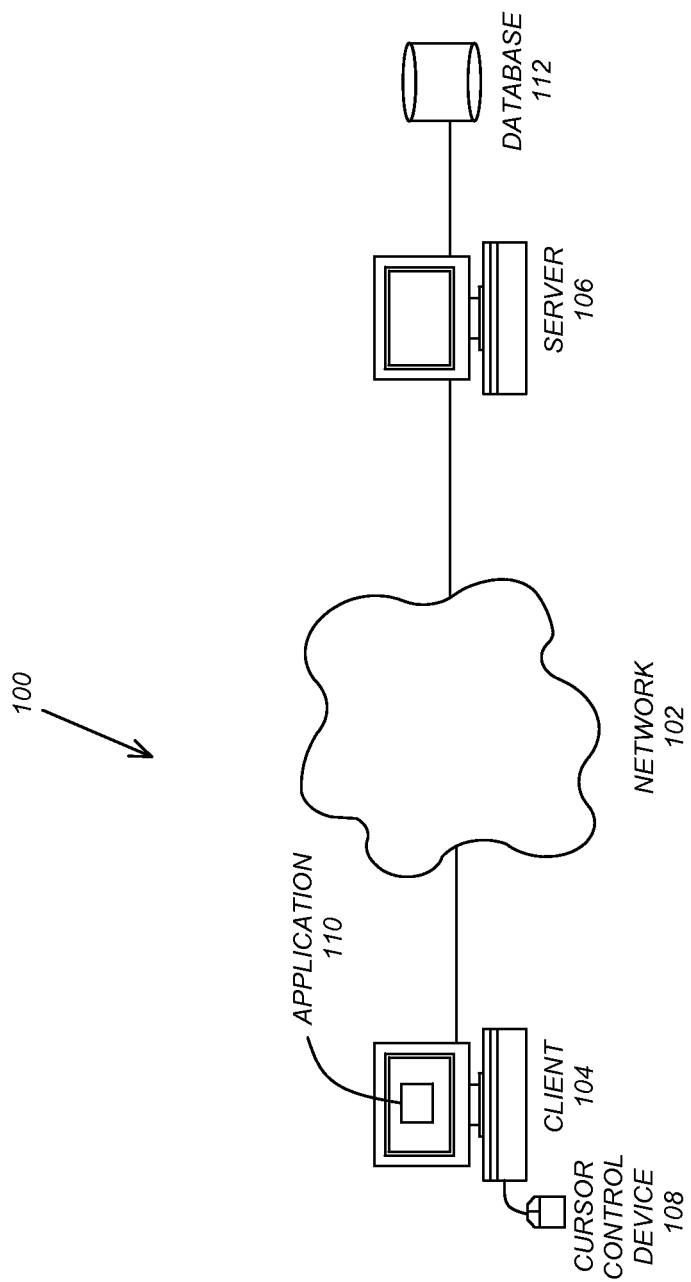
FIG. 1 schematically illustrates a hardware and software environment in accordance with one or more embodiments of the invention.

FIG. 1 schematically illustrates a hardware and software environment in accordance with one or more embodiments of the invention, and more particularly, illustrates a typical distributed computer system 100 using a network 102 to connect client computers 104 to server computers 106. A typical combination of resources may include a network 102 comprising the Internet, local area networks (LANs), wide area networks (WANs), systems network architecture (SNA) networks, or the like, clients 104 that are personal computers or workstations, and servers 106 that are personal computers, workstations, minicomputers, or mainframes. Such clients 104 and/or servers 106 are configured to execution an application and have memory for storing data. Additionally, both client 104 and server 106 may receive input (e.g., cursor location input) and display a cursor in response to an input device such as cursor control device 108.

A network 102 such as the Internet connects clients 104 to server computers 106. Additionally, network 102 may utilize radio frequency (RF) to connect and provide the communication between clients 104 and servers 106. Clients 104 may execute a client application 110 and communicate with server computers 106. Further, the software executing on clients 104 may be downloaded from server computer 106 to client computers 104.

Server 106 may manipulate data in database 112 (independently from or pursuant to the request of client 104).

Alternatively, database 112 may be part of or connected directly to client 104 instead of communicating/obtaining the information from database 112 across network 102.

Generally, these components 108-112 all comprise logic and/or data that is embodied in or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Software Embodiments

Files and folders are often maintained on both client 104 and server 106. Further, applications 110 on both client 104 and server 106 may request a copy and/or transfer of a file or folder from across network 102. One or more embodiments of the invention persistently maintain a table (e.g., on client 104, server 106, or both client 104 and server 106) with checksum/hash values and file locations.

Every time a file copy operation is performed, a checksum and file location is generated on the files at the source location and that information is stored in the persistent table. Before any files are copied from the source, the source files have their checksums compared to the list of known checksums at the target, and any checksums that match are to be copied from that target location, instead of from the source location.

All files that are copied using such a technique (referred to herein as transitive file copying) have their checksum and location added to the persistent table on the target machine so future copy operations can quickly locate new files that have previously been copied. When a file is copied from the source to the target, it is touched (e.g., using the "touch" command) so that its date/time/version/attributes stamp match the original file from the source.

Accordingly, embodiments of the invention perform a query using a file's checksum information on the target machine instead of performing the file copy from the source as requested. If the query finds the file, the file is copied from the first location on the target to the second location on the target instead of completing the copy/transfer across the network 102. Alternatively, the file may be copied from an optimal location (e.g., location with largest bandwidth connection to the target, the closest location, location with estimated fastest transfer speed, etc.)

FIGS. 2, 3, and 4 illustrate the functionality of transitive file copying in accordance with one or embodiments of the invention. FIG. 2 illustrates the copying of Folder 1 from the source 202 to the target 204. In FIG. 2, neither File A nor File B exist on the target 204. Accordingly, both File A and File B must be copied over the network 102.

FIG. 3 illustrates the copying of a file from a local location on the target 204 to a second location on the target 204. In FIG. 3, Folder 2 is copied from the source 202 to the target 204. File A already exists on the target in a different folder (i.e., Folder 1). Accordingly, File A is copied locally and only File C needs to be copied over network 102.

FIG. 4 illustrates the copying of all files from a local location on the target 204 to a different location on the target 204. In FIG. 4, Folder 3 is copied from the source 202 to the target 204. File A, File B, and File C already exist on the target 204. Accordingly, Files A, B, and C are all copied locally. It can also be noted that File A exists in two separate folders (e.g., Folder 1 and Folder 2) on the target 204. Thus, File A can be copied from either location.

Exemplary Use Case

Embodiments of the invention may be useful in networks spread out throughout the world in various different scenarios. For example, a mechanical designer in China may be working on a solid modeling document consisting of 100 unique parts. The mechanical designer may need to send the work to Boston when it is complete. The Boston location may already have the original solid modeling assembly/document. Further, assume that the mechanical designer needs to create a new assembly that is unique from the original assembly only in name, and in 1 of the 100 unique parts. Thus, the mechanical designer creates a local copy (in China) of the assembly document, renames the assembly, modifies 1 of the 100 parts, and save the assembly.

When the designer attempts to send the file to Boston, the prior art would require the designer to resend the entire assembly from Boston to China again. However, in accordance with embodiments of the invention, the designer only needs to send a name change, and the one unique part over the network. The rest of the files would be copied locally from the original assembly in Boston to the new assembly in Boston.

Assemblies such as airplanes, railcars, automobiles, etc. may consist of thousands of unique and non-unique files. Accordingly, the transfer of such files across a low bandwidth connection can consume a high percentage of available bandwidth while also requiring a considerable amount of time to complete the transfer. Using embodiments of the invention, users can collaborate and share more efficiently in the global market where local storage and hard drive space may be inexpensive, but high speed network connections may be prohibitively expensive, simply not available, or overburdened.

Logical Flow

Figure 5:
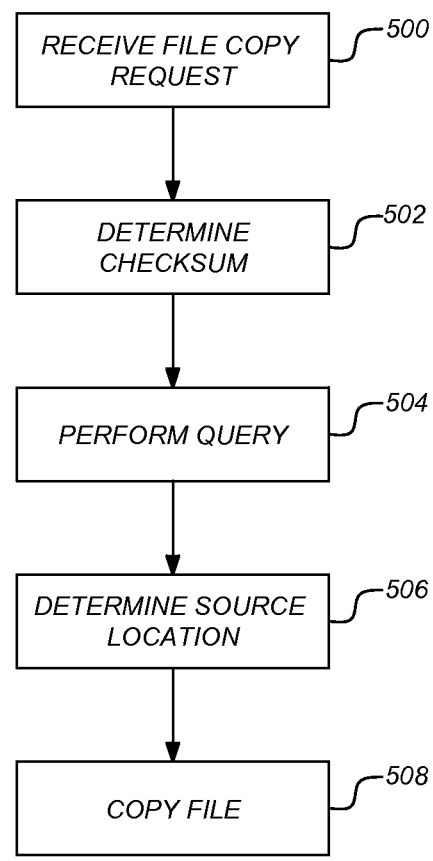
FIG. 5 is a flow chart illustrating the logical flow for copying files in accordance with one or more embodiments of the invention.

FIG. 5 is a flow chart illustrating the logical flow for copying files in accordance with one or more embodiments of the invention. At step 500, a request to copy a first file from a first source location to a first target location is received (e.g., from a user).

At step 502, a first checksum value of the first file is determined. As used herein, the checksum may be a message-digest algorithm 5 (MD5) hash or any other unique hash number. Such hash numbers are based on properties of the file and likely do not change merely by changing the name of a file.

At step 504, a query is performed. The query uses the first checksum value to find a second source location for a second file. The second file has a second checksum value that is equivalent to the first checksum value. Further, the second file is located at the second source location. As part of the query step 504, a persistent table may be maintained (e.g., at the first target location). Such a persistent table can contain file checksum values for each file checksum value, one or more file source locations. To perform the query, the table is searched for a second checksum value that is equivalent to the first checksum value. In other words, the table is searched to determine all of the locations for the first file. If an equivalent checksum value is found in the table, it means that the file (either under the same name or otherwise) may be found at the location specified in the table. Such a persistent table may be maintained by adding the first target location and checksum to the persistent value once the file has been copied to the first target location.

At step 506, a determination is made regarding whether to copy the first file from the first source location or the second file from the second source location. In other words, the system determines which source location is to be used to retrieve/copy the requested file.

At step 508, the first source file or second source file is copied/transferred to the first target location based on the determining.

The determining step 506 and copying step 508 may utilize different methods for determining which source location to use. For example, the first and second source locations may be analyzed to determine which location is closest to the first target location (e.g., within the network, in a different city, state, country, etc.) and the copying/transfer is performed from the closest location. In an alternate embodiment, the determining step includes the obtaining/determining of transfer speeds from the first and second source locations to the target location (e.g., using a ping command or other method that analyzes a number of packets to be transferred) and copies the source file from the source location with a faster transfer speed.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide a method for conducting transitive file copying wherein a file is copied from a different location than that requested based on properties of the file and the network being utilized to conduct the transfer.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for copying files, comprising:
   (a) initializing, at a target, a request to copy a first file from a first source location on a source to a first target location on the target, wherein:
      (i) the target is receiving a solid modeling assembly comprising multiple unique parts, wherein each unique part has a corresponding part file; and
      (ii) the request further comprises the solid modeling assembly;
   (b) transmitting the request, from the target to the source;
   (c) in response to the transmitting, receiving, at the target, from the source, a first checksum value of the first file;
   (d) prior to performing a copy operation, performing a query, at the target, using the first checksum value to find a second source location on the target for a second file, wherein:
      (i) the second file has a second checksum value that is equivalent to the first checksum value; and
      (ii) the query indicates that the second file is located at the second source location on the target;
   (e) determining, based on the query, whether to copy the first file from the first source location or the second file from the second source location; and
   (f) based on the determining and in response to the request, copying the second source file to the first target location on the target instead of copying the first file from the first source location, wherein instead of copying all of the part files in the modeling assembly from the source to the target, changed part files are copied from the source to the target, and remaining part files in the modeling assembly are copied from the second source location on the target to the first target location on the target.

2. The method of claim 1, wherein the first checksum and second checksum each comprise a message-digest algorithm 5 (MD5) hash.

3. The method of claim 1, wherein the first checksum and the second checksum each comprise a unique hash number.

4. The method of claim 1, further comprising maintaining a persistent table comprised of:
   file checksum values; and
   for each file checksum value, one or more file source locations; and
   wherein the performing the query step further comprises searching the table for the second checksum value that is equivalent to the first checksum value.

5. The method of claim 4, further comprising subsequent to performing the copy operation, adding the first target location and second checksum value to the persistent table.

6. The method of claim 4, wherein the persistent table is maintained at the target.

7. The method of claim 1, wherein the determining step and copying step further comprise:
   determining whether the first source location or second source location is closer to the first target location; and
   copying the source file, to the first target location, from the source location that is closest to the first target location.

8. The method of claim 1, wherein the determining step and copying step comprise:
   obtaining a first transfer speed from the first source location to the first target location;
   obtaining a second transfer speed from the second source location to the first target location;
   determining whether the first transfer speed or second transfer speed is faster; and
   copying the source file, to the first target location, from the source location with a faster transfer speed.

9. The method of claim 8, wherein the first transfer speed and the second transfer speed are obtained using a ping command.

10. An apparatus for copying files in a computer network system comprising:
   (a) a computer having a memory;
   (b) an application executing on the computer, wherein the application is configured to:

(i) initialize, at a target, a request to copy a first file from a first source location on a source to a first target location on the target, wherein:
  (1) the target is receiving a solid modeling assembly comprising multiple unique parts, wherein each unique part has a corresponding part file; and
  (2) the request further comprises the solid modeling assembly;
(ii) transmit the request, from the target to the source;
(iii) in response to the transmit, receive, at the target, from the source, a first checksum value of the first file;
(iv) prior to performing a copy operation, perform a query, at the target, using the first checksum value to find a second source location on the target for a second file, wherein:
  (1) the second file has a second checksum value that is equivalent to the first checksum value; and
  (2) the query indicates that the second file is located at the second source location;
(v) determine, based on the query, whether to copy the first file from the first source location or the second file from the second source location; and
(vi) based on the determination and in response to the request, copy the second source file to the first target location on the target instead of copying the first file from the first source location, wherein instead of copying all of the part files in the modeling assembly from the source to the target, changed part files are copied from the source to the target, and remaining part files in the modeling assembly are copied from the second source location on the target to the first target location on the target.

11. The apparatus of claim 10, wherein the first checksum and second checksum each comprise a message-digest algorithm 5 (MD5) hash.

12. The apparatus of claim 10, wherein the first checksum and the second checksum each comprise a unique hash number.

13. The apparatus of claim 10, wherein the application is further configured to maintain a persistent table comprised of:
  file checksum values; and
  for each file checksum value, one or more file source locations; and
  wherein the application is configured to perform the query by searching the table for the second checksum value that is equivalent to the first checksum value.

14. The apparatus of claim 13, wherein the application is further configured to add the first target location and the second checksum value to the persistent table subsequent to performing the copy operation.

15. The apparatus of claim 13, wherein the persistent table is maintained at the target.

16. The apparatus of claim 10, wherein the application is configured to determine and copy by:
  determining whether the first source location or second source location is closer to the first target location; and
  copying the source file, to the first target location, from the source location that is closest to the first target location.

17. The apparatus of claim 10, wherein the application is configured to determine and copy by:
  obtaining a first transfer speed from the first source location to the first target location;
  obtaining a second transfer speed from the second source location to the first target location;
  determining whether the first transfer speed or second transfer speed is faster; and
  copying the source file, to the first target location, from the source location with a faster transfer speed.

18. The apparatus of claim 17, wherein the first transfer speed and the second transfer speed are obtained using a ping command.

19. The method of claim 1, further comprising:
  touching the second source file to update a date property, a time property, a version property, and an attribute property of the second source file to match the first source file.

20. The apparatus of claim 10, wherein the application is further configured to:
  touch the second source file to update a date property, a time property, a version property, and an attribute property of the second source file to match the first source file.

* * * * *